3,813,289
ORGOTEIN FROM RED BLOOD CELLS
Wolfgang Huber, San Francisco, Silver H. Chow, Sunnyvale, and Mark G. Saifer, Berkeley, Calif., assignors to Diagnostic Data, Inc., Mountain View, Calif.
No Drawing. Continuation-in-part of application Ser. No. 273,277, July 19, 1972. This application Sept. 22, 1972, Ser. No. 291,320
Int. Cl. A61k *17/66;* C7g *7/4*
U.S. Cl. 195—4    16 Claims

ABSTRACT OF THE DISCLOSURE

Orgotein substantially free from hemoglobin and carbonic anhydrase is obtained from red blood cells by the steps of heating at least the red blood cell portion of blood at a pH from 5 to 8 at which the hemoglobin precipitates and at a temperature of about 60–80° C.; cooling the heated mixture; separating the precipitated proteins from an aqueous solution of the heated mixture; and separating the orgotein from the supernatant, e.g., by the addition of acetone to the cooled solution, by lyophilization, by ultrafiltration, or by adsorption on and elution from an ion exchange resin column.

BACKGROUND OF THE INVENTION

This invention relates to a novel process for the production of an orgotein-rich protein concentrate from red blood cells. This is a continuation-in-part of applications S.N. 273,277 and 273,278, both filed July 19, 1972; S.N. 273,277 is now abandoned.

Orgotein defines a family of protein congeners having a characteristic combination of physical, chemical and pharmacological properties. Each of these congeners is characterized physically by being the isolated, substantially pure form of a globular, buffer and water-soluble protein having a highly compact native conformation which, although heat labile, is stable to heating, e.g., at about 65° C. in water or a buffer solution containing a salt of a divalent metal having an ionic radius of 0.60 to 1.00 A. and which on gel electrophoresis at pH 8.45 in 0.1 M Tris-glycine buffer gives a characteristic multiple-band pattern. Chemically, each is characterized by containing all or all but 1–2 of the essential aminoacids, a small percentage of carbohydrate, no lipids, 0.1 to 1.0% metal content provided by about 3 to 5 gram atoms per mole of one or more chelated divalent metals having an ionic radius of 0.60 to 1.00 A., and substantially no chelated monovalent metals or cell poisons in the molecule. Pharmacodynamically, each of the congeners is characterized by being a non-toxic, immunologically well-tolerated, injectable protein whose pharmacological activity includes anti-inflammatory activity which, like its compact conformation, is releated to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

From recent literature data, it is now apparent that the orgotein family of metalloproteins includes and proteins previously isolated in various states of purity and given the names hepatocuprein, Mann & Keilin, Proc. Royal, Soc. for Biol. Sci., *126* 303 (*1939*); cerebrocuprein, Porter & Ainsworth, J. Neurochem., *1* 260 (1957); erythrocuprein, Markowitz et al., J. Biol. Chem., *234,* 40 (1959); and cytocuprein, Carrico & Deutsch, J. Biol. Chem., *244,* 6087 (1969). For other references, see Mohamed & Greenberg, J. Gen. Physiol. *37,* 433 (1954); Porter & Folch, Arch. Neurol. Psychiat. *77,* 8 (1957); Porter & Ainsworth, J. Neurochem., *5,* 91 ( 1959); Krimmel et al., J. Biol. Chem., *234,* 46 (1959); Wyman, Biochem. Biophys. Acta, *45,* 387 (1960); Shields et al., J. Clin. Inv., *40,* 2007 (1961); Markowitz et al., Anal. Chem., *33,* 1594 (1961); Porter et al., Arch. Biochem Bioph., *105,* 319 (1964); Stansell & Deutsch, J. Biol. Chem., *240,* 4299 (1965); ibid., *240,* 4306 (1965); Stansell & Deutsch, Clin. Chem. Acta, *14,* 598 (1966; McCord & Fridovich, J. Biol. Chem., *244,* 5753 (1969); Hartz & Deutsch, J. Biol. Chem., *244,* 4565 (1969); McCord & Fridovich, J. Biol. Chem., *244,* 6056 (1969); Carrico & Deutsch, ibid, *245,* 723 (1970). These metallo-proteins have been reported to possess very high superoxide dismutase (sodase) activity. See McCord & Fridovich, J. Biol. Chem., *244,* 6049 (1969); Keele, McCord and Friedovich, J. Biol. Chem., *245,* 6176 (1970); ibid, *246,* 2875 (1971).

In Application Ser. No. 576,454, filed Aug. 31, 1966, now abandoned, (Belgium Pat. 687,818, British Pat. 1,160,151) there is disclosed a multi-step process for the isolation of orgotein from animal tisue, e.g., bovine liver.

In Application Ser. No. 150,809, filed June 7, 1971, now U.S. Pat. 3,687,927, there is disclosed an improved process which eliminates several steps and increases the yield substantially.

In U.S. Pat. 3,579,495, there is claimed a process for the isolation or orgotein from red blood cells by a multistep process which includes a solvent pre-purification to remove the hemoglobin and a heating step, in an overall yield of about 0.01%, calculated on the packed red cells.

In some of the literature references cited above, a DEAE-cellulose chromatographic purification step was used as part of a multi-step process for isolating orgotein from red blood cells. In the simplest of these processes, the red blood cells were free of hemoglobin by solvent precipitation and then $K_2HPO_4$ and acetone-fractionated. A portion of the fractionated soluble proteins of lysed bovine red blood cells was chromatographed at pH 7.4, yielding from 3 liters of packed cells 190 mg. of orgotein having a superoxide dismutase activity of 3,300 units/mg. (.006% overall yield; 60% recovery of orgotein). This process, while acceptable on a laboratory scale, would not be economically competitive on a commercial scale with processes subsequently developed. For example, to produce one kilogram of orgotein would require over 7,500 liters of chloroform, 4,500 liters of ethanol, 7,000 kg. of $K_2HPO_4$ and 5,000 liters of acetone, if the process were scaled up without change.

In the process of Wolfgang Huber et al., U.S. 3,763,137, a solvent-free process is claimed in which substantially pure orgotein is obtained directly from lysed red blood cells in one step by ion-exchange chromatography. The process of U.S. 3,763,137, while free from the difficulties associated with the use of a mixed solvent and ammonium sulfate as precipitants, has the disadvantages that large volumes of liquid must be chromatographed, thus requiring chromatographic columns of correspondingly large size. Moreover, more than 99.8% of the proteins which are chromatographed are extraneous proteins, thus limiting the life of the column and speed of chromatography.

The process requires dialysis of the whole lysate to reduce its ionic strength to the necessary low level. The dialyzed lysate is not stable and the ion exchange column becomes clogged by precipitating proteins unless the lysate is clarified during sample loading. Flow rate through the column is relatively slow and the orgotein adsorbing capacity of the column is reduced by the adsorption of large amounts of proteinaceous impurities. Also, the selectivity of the adsorption elution of some orgotein congeners, e.g., horse, is poorer than others. In short, whereas the process of the above-cited prior filed application is a marked improvement over earlier processes for isolating orgotein, it too has deficiencies.

It has now been found that these disadvantages of the processes of U.S. 3,763,137 can be eliminated, while retaining most of its simplicity and economical operation, by pre-treatment of the red blood cells to obtain a solution which retains the orgotein but which is substantially hemoglobin- and carbonic anhydrase-free. Such a solution can be chromatographed employing a much smaller chromatographic column than is required when using lysed red blood cells. This is particularly true if the starting solution is concentrated before chromatography, which cannot readily be done with lysed red blood cells. Moreover, because less than one percent of the proteins which are passed through the chromatographic column of the process of Ser. No. 205,610 need be chromatographed in the process of this invention in order to isolate the same amount of orgotein, the column life of the chromatographic resin employed is much longer, flow rates are better and the selectivity of the resin is higher, thus requiring a less precisely regulated elution. The process has the obvious advantage over that of U.S. 3,579,495 that the carbonic anhydrase and hemoglobin of the red blood cells, which constitute about 99% of the proteins thereof, are removed simultaneously without the use of organic solvent.

It is an object of this invention to provide a process for the isolation of orgotein from red blood cells which retains the advantages of simplicity and feasibility on a commercial scale while at the same time providing a hemoglobin- and carbonic anhydrase-free orgotein concentrate from which pure orgotein can more readily economically be produced on a commercial scale. Other objects will be apparent to those skilled in the art to which this invention pertains.

SUMMARY OF THE INVENTION

According to this invention, an orgotein-rich concentrate substantially free from hemoglobin and carbonic anhydrase is obtained from red blood cells (RBC) by the steps of heating at least the red blood cell portion of blood at a pH from 5 to 8 at which the hemoglobin precipitates and at a temperature of about 60–80° C.; cooling the heated mixture; separating the precipitated proteins from an aqueous solution of the heated mixture; and separating the orgotein from the supernatant.

DETAILED DISCUSSION

It is surprising that both the hemoglobin and carbonic anhydrase can be selectively precipitated substantially completely while retaining the orgotein in solution, because of the large proportion, i.e., at least 95%, of starting proteins which are precipitated. Also, hemoglobin is a relatively heat stable protein. Moreover, heating does not insolubilize it or only partially insolubilizes it outside the pH range employed in the process of this invention.

In a preferred embodiment, the process of this invention comprises the following steps:

(1) Dilute whole blood with up to about 3, e.g., 0.5–1.5, volumes of water;

(2) Heat the whole blood at about 65–75° C. for about 1 hour to 8 hours;

(3) Cool the heated mixture, preferably to at least 40° C. and more preferably to room temperature or lower;

(4) Separate the precipitated proteins, preferably by centrifugation; and (5) Separate the crude orgotein from the supernatant, preferably by ion exchange resin chromatography.

In other embodiments, one or more of the following variations of this preferred embodiment are employed:

(a) In step (1) serum-free blood cells, preferably suspended in 1–3 volumes of water, are employed as starting material for the heating step;

(b) The heating is conducted at a lower temperature for a longer period of time, e.g., 60° C. for three or more hours, or a higher temperature for a shorter period of time, e.g., 80° C. for 30 minutes to one hour;

(c) The heating is conducted at a pH of about 7;

(d) Step (3) is conducted after or during step (4);

(e) Orgotein is isolated from the supernatant in step (5) by precipitation with acetone or other water-miscible organic solvent;

(f) Orgotein is isolated from the supernatant in step (5) by ultrafiltration or by freeze drying;

(g) A portion of the water is removed from the supernatant before isolation of the orgotein by distillation under vacuum, e.g., at 20–60° C.

The heating step can be conducted on whole blood, which is preferred since the mechanical steps of removing the serum and washing the packed red blood cells are eliminated. It can also be conducted on serum-free RBC. The latter produces somewhat purer orgotein but this advantage is offset by the expense of separating and washing the RBC prior to heating. Moreover, the additional protein impurities can be separated with minimal additional effort with a proteolytic enzyme as described hereinafter. Therefore, whole blood is the preferred starting material.

Although the heating step can be conducted on undiluted whole blood or serum-free packed red blood cells, mechanical problems of mixing and heat exchange are involved in doing so. Therefore, the whole blood and especially the serum-free red blood cells are preferably mixed with water, e.g., up to about 3, perferably about 1–2 volumes, before heating. The water can, if desired, contain a buffer agent and/or a source of divalent metal ion, e.g., Cu and/or Zn, desirably at relatively low concentrations, e.g., below 0.05 M. When using whole blood, trisodium citrate or other coagulation inhibitor can be added to prevent coagulation prior to lysis of the hemoglobin.

The heating step is preferably conducted at about the isoelectric point of the hemoglobin of the red blood cells, viz., about pH 7. The isoelectric pH of various hemoglobins is within the range of 6.5–7.5, usually 6.7 to 7.4. At a low pH, e.g., below 5, the hemoglobin is denatured but only partially precipitates. Hemoglobin of some species, e.g., bovine and equine, precipitate at all pH's within the range of 5–8. Other hemoglobin precipitates only at about its isoelectric point.

The pH of the red blood cells can be adjusted with any suitable acid or base.

The heating step is conducted at about 60–80° C., preferably about 70–75° C., until all or substantially all of the hemoglobin has precipitated. The exact temperature and time is not critical as long as the hemoglobin is substantially completely precipitated. Higher temperatures and longer heating times sacrifice over all orgotein yield. Lower temperatures and shorter heating times produce a less pure orgotein. About 1–2 hours suffice at about 75° C. Heating for one hour or even longer at 60–75° C. does not significantly affect the final yield of pure orgotein. However, heating at 80° C. for one hour destroys about ¼ to ¾ of the orgotein. The heating step can be conducted batchwise or, by the use of elongate heating and cooling zones, continuously.

Heat labile proteins, including enzymes, are removed from the red blood cells by heat denaturation along with the hemoglobin. Carbonic anhydrase is a prominent component of such labile proteins. The red blood cells are heated until the carbonic anhydrase is inactivated. For a review on the sensitivity of carbonic anhydrase to heat, see R. P. Davis, The Enzymes, vol. 5, 545 (1961) Academic Press, New York City.

When the hemoglobin has precipitated, the carbonic anhydrase and all or most all of the other heat labile enzymes and non-enzymatic proteins in the supernatant have precipitated also, because the hemoglobin is more stable. For example, at 60° C., heating longer than 20 minutes is usually required to inactivate the carbonic anhydrase and the other heat labile proteins and at 65° C., 10–15 minutes suffices.

The completeness of hemoglobin precipitation can readily be ascertained by the color of the supernatant, which should be at most a pale pink.

Occasionally with aged blood, all of the red color of the hemoglobin may not precipitate if the heating step is conducted at an acid pH. If this occurs before or after the removal of the hemoglobin precipitated by the heating step, any residual color can be precipitated by adjusting the pH to 7 or above, preferably 7–7.5 before the orgotein is precipitated, e.g., before or after the separation of the precipitated hemoglobin, e.g., as part of the pre-precipitation of extraneous proteins with acetone. The precipitated red color can be removed in the same manner as the hemoglobin precipitated in the heating step.

After heating, the heated red blood cells are cooled to below about 50° C., preferably room temperature or colder, e.g., by passing through a heat exchanger.

The hemoglobin and other proteins precipitated in the heating step are then removed, preferably by centrifugation, and discarded. Settling or filtration, preferably vacuum filtration with filter aid, e.g., diatomaceous earth, can also be employed.

After the removal of the precipitated hemoglobin, the orgotein is separated from the supernatant, e.g., by the addition of acetone to the cooled solution, by lyophilization, by ultrafiltration, or by adsorption on and elution from an ion exchange resin column.

A preferred method for separating orgotein from the supernatant is by ion exchange chromatography, e.g., employing the techniques described in 3,763,137 or U.S. 3,579,495, the disclosures of which are incorporated by reference.

An especially preferred method which is readily adaptable for production lots of orgotein is to pass the supernatant obtained from the heating step through a DEAE-cellulose or like ion column as described in Ser. No. 205,610. In such a step, the supernatant, which has an ionic strength below 0.01 M, is passed over a DEAE-cellulose or other weakly basic ion exchange column, thereby adsorbing orgotein on the ion exchange resin; washing the column with water or buffer of an ionic strength of less than about 0.01 M; and eluting the orgotein at a higher ionic strength, e.g., about 0.02 to about 0.03 M. Depending on the condtitions employed, crude, e.g., 50% purity, to highly pure orgotein can be eluted from the column.

Alternatively, the supernatant can be purified by molecular sieve chromatography, e.g., passed through a column of epichlorohydrin cross-linked dextran resin (Sephadex G–75 Superfine, Pharmacia, Sweden). In a production model, the head of the column is replaceable so that when the upper portion of the column has adsorbed orgotein to the extent of its capacity, the head portion is removed and replaced with fresh resin, leaving the remainder of the column intact.

The supernatant can be pre-purified prior to the isolation of the orgotein therefrom by the addition thereto of a proteolytic enzyme as claimed in our prior filed application S.N. 273,278, filed July 19, 1972, entitled "Enzymatic Treatment of Protein Mixtures Containing Orgotein." Surprisingly, for all practical purposes, orgotein is substantially inert to degradation by proteolytic enzymes. Thus, the crude orgotein in the supernatant can be purified by selectively digesting the extraneous proteins, preferably with Strep. griseus proteinase, pancreatin, subtilisin, papain or bromelain, in a weight ratio of enzyme to proteins in the supernatant of about 1:2 to 1:1,000, depending on the selected enzyme and the proportion of extraneous proteins to orgotein in the mixture. Pure or substantially pure orgotein can be isolated from the digested mixture in a conventional manner, e.g., by ultrafiltration. The protein fragments from the enzymatic digestion and excess ions can conveniently be removed from the digested mixture by dialysis prior to isolation of the orgotein therefrom.

If it is desired to separate the orgotein from the supernatant in one step, it can be precipitated therefrom with acetone. About 1–1.5 volumes of acetone, calculated on the volume of liquid containing the orgotein, is sufficient to precipitate all of the orgotein. Orgotein of higher purity, e.g., about 50% or higher, can sometimes be obtained in the process of this invention by pre-precipitating a portion of the dissolved proteins with acetone. If less than an equal volume of acetone is employed, e.g., ½ to ¾ volume, very little if any orgotein is precipitated with the extraneous proteins. After removal of the precipitated extraneous proteins, e.g., in the manner described above for the removal of the precipitated hemoglobin, the orgotein is then precipitated with the remainder of the acetone, e.g., ¾ to 1.5 volumes, calculated on the aqueous solution. However, this solvent pre-precipitation step precipitates very little proteinaceous impurities if the heating step was conducted at 75°–80° for 1–2 hours at pH 7.0, because of the completeness of the precipitation in the heating step.

The pre-precipitation of the extraneous proteins and the orgotein is preferably conducted in the cold, e.g., 0–5° C. However, any temperature, e.g., ambient temperature, up to the boiling point of the acetone can be employed.

Acetone is employed in the process of this invention for reasons of economy. However, it will be apparent to those skilled in the art that other more expensive water-miscible solvents can also be employed to precipitate the orgotein, e.g., methyl ethyl ketone, tetrahydrofuran, and are the functional equivalents of acetone in the process of this invention.

The precipitated orgotein should be freed of residual solvent and moisture as soon as possible, e.g., by freeze-drying and lyophilization, or redissolution in an aqueous vehicle for further purification, to avoid orgotein loss.

Although an orgotein-rich precipitate free of hemoglobin and carbonic anhydrase can be obtained by the acetone-precipitation technique, the hemoglobin-free supernatant is eminently suited for molecular sieve or weakly basic-ion-exchange chromatographic purification, e.g., in the manner described in U.S. 3,763,137 or U.S. 3,579,495. In situations where chromatographing large volumes of liquid is objectionable, this hemoglobin-free supernatant can be concentrated before chromatography by ultrafiltration or freeze drying. Batch-wise adsorption of the orgotein to weakly basic ion exchanger can also be employed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Lyse washed bovine erythrocytes in twice their volume of water containing 1 µg. of $Cu^{++}$ and $Zn^{++}$ per 5 µg. of estimated orgotein in the red blood cells and heat to 70–75° C. for 1–2 hours at a pH of about 7, i.e., the isoelectric point of the hemoglobin. Dilute 2–3 fold, cool and centrifuge the resultant slurry at 4° C. Dialyze and lyophilize the supernatant which contains substantially purified orgotein.

EXAMPLE 2

Suspend washed and serum-free frozen equine packed red blood cells in twice their volume of water. Adjust pH to 5.5 with acetic acid. Heat the suspension for 15 minutes at 65° C. Cool to about ambient temperature or colder and remove the precipitated proteins by centrifugation. Adjust pH to 7.5 to precipitate the red color and centrifuge. Mix the supernatant with ¾ volume of ice-cold acetone. Centrifuge and discard the precipitate. Add a second ¾ volume of cold acetone and centrifuge to separate the resultant precipitate, which consists of about 50% orgotein. To store the crude orgotein, freeze-dry and lyophilize the precipitate.

Substantially pure orgotein can be isolated from the thus-produced crude orgotein by molecular sieve gel filtration using cross-linked dextran (Sephadex G–75) as described in U.S. 3,579,495 or by ion-exchange resin chromatography with DEAE-cellulose as described in Preparation 3 of U.S. 3,637,640 or as claimed in U.S. 3,763,137.

EXAMPLE 3

Follow the procedure of Examples 1 or 2 employing bovine, human, chicken, sheep or pig red blood cells and heat at about their respective hemoglobin isoelectric points, e.g., pH 6.8–7.4, preferably about 7.0.

EXAMPLE 4

Follow the procedure of Examples 1, 2 or 3, except heat the red blood cells in the absence of added water or in the presence of an equal volume of water.

EXAMPLE 5

Follow the procedure of Example 2, except add 1½ volumes of acetone all at once. Orgotein of lower purity is obtained. Triturating the precipitate with a minimal volume of water slectively extracts the orgotein from the precipitate. Centrifugation yields a solution of orgotein of about the same purity as that obtained in Example 2.

EXAMPLE 6

Follow the procedure of Examples 2 or 3, except omit the first centrifugation.

EXAMPLE 7

Follow the procedure of Examples 2, 3, 4 or 6, except do not separate any of the precipitates until after the addition of the first ¾ volume of acetone.

EXAMPLE 8

Follow the procedure of any of Examples 1–7, except heat to 80° C. for about 30 minutes in the heating step.

EXAMPLE 9

Follow the procedure of Example 2 but substitute ultrafiltration for acetone precipitation in order to reduce the volume to be chromatographed.

EXAMPLE 10

Follow the procedure of Example 2 but substitute lyophilization for the acetone precipitation.

EXAMPLE 11

Follow the procedure of Example 1, except heat bovine or human red blood cells diluted 1:2 with water, pH 7.0, for 18 hours at 65° C.

EXAMPLE 12

Follow the procedure of Example 2 using bovine, equine, human, chicken, sheep or pig RBC, but substitute an enzymatic digestion of the proteinaceous impurities for the acetone precipitation, e.g., by the addition to the supernatant from the heating step of 1–3 mg. of pancreatin per ml. of starting packed red blood cells and incubating at about 37° C. for 15–48 hours. Essentially all proteins except orgotein are digested into small, dialyzable fragments. Essentially pure orgotein can be isloated from the digested mixture by ultrafiltration.

EXAMPLE 13

Follow the procedure of Example 1 but employ as starting material whole blood stabilized against coagulation with sodium citrate.

Mix two volumes of freshly collected bovine blood (85 mg./ml. total protein, 20 μg./ml. orgotein) with one volume of 3.8% standard aqueous. trisodium citrate solution, two volumes of water containing 25 μg./ml. M $Cu^{++}$ and 25 μg./ml. M $Z^{++}$, thereby obtaining a whole blood solution containing 1,000 μg. $Cu^{++}$ and $Zn^{++}$ ions per 100 ml. Heat to 75° C. and maintain at that temperature for 2 hours. Cool to about 10° C. by adding 150 ml. ice water. This dilution also eliminates the necessity of a separate washing step after centrifugation. Centrifuge and separate the supernatant (234 ml.). The supernatant contains a total of 1.6 mg. of protein and 12–17 μg./ml. of orgotein, which represents at least a 40 fold purification and a 70% recovery of the orgotein in the starting blood. This compares with a 90% recovery of orgotein and at least 50 fold purification when starting with unwashed red blood cells (90 mg./ml. total protein) instead of whole blood.

Substantially pure orgotein is isolated from the supernatant by lyophilization, as described in Example 1, or molecular sieve filtration or DEAE-cellulose chromatography as described in Example 2.

To purify the orgotein prior to isolation as described above, mix 59 ml. of the supernatant from the heat purification containing 12–17 μg./ml. orgotein with 50–150 mg. of pancreatin and 0.1% sodium azide (to prevent bacterial growth) and maintain at 37° C. for 15 hours and then cool. The solution contains 1 mg./ml. total protein and 12 μg./ml. of orgotein.

In carrying out the above procedures, simplicity and convenience is balanced to a certain extent against the purity desired for the orgotein isolated from the supernatant obtained after removal of the precipitated proteins from the heated red blood cells. Thus, acetone precipitation produces a purer orgotein but has the disadvantage of requiring the use of organic solvent. DEAE-cellulose ion exchange column chromatography produces orgotein of good purity but has the disadvantages of requiring a dialysis step to bring the ionic strength to suitably low levels and the chromatography of large volumes of liquid. The latter disadvantage, however, can be eliminated by pre-concentration of the supernatant by freeze-drying or low temperature evaporation of a portion only of the supernatant. Batch adsorption, by slurrying the supernatant with an ion exchange resin, is more convenient than column chromatography but is less efficient. Lyophilization, unless preceded by dialysis, achieves no purification per se but is a very convenient method of isolating the orgotein from the large volume of supernatant.

PURIFIED ORGOTEIN

The crude orgotein obtained according to the procedure of any of the above examples can be isolated in pure form by molecular sieve gel chromatography of up to 2 to 5 gm. of the crude orgotein over a column (3.2 cm. x 88.5 cm.; total bed vol., 711.5 ml., void volume, 265.5 ml.) of Sephadex G–75 Superfine (Pharmacia, Sweden) epichlorohydrin cross-linked dextran resin, collecting the eluate in 5.4 ml. fractions and measuring the $A_{265}$ and $A_{280}$ absorptions thereof. Beginning at about Fraction 50, these absorptions climb precipitously and reach a peak at about Fraction 68. Fractions 66–73 contain a majority of the total orgotein in an ultra-pure state. By Fraction 98, these absorptions fall to zero until about Fraction 116. The only significant impurities appear in tubes 45–60 and tubes 118–150.

Alternatively, apply an aqueous solution of up to about 10 gm. of the crude orgotein obtained in Example 1 to a column (2.5 x 30 cm.; bed vol., 147 ml.) of DEAE-cellulose (Fibrous DEAE–23, Reeve-Angel) equilibrated with 0.005 M phosphate buffer, pH 6.0. Develop the column at a flow rate of 240 ml./hr. with 0.005 M phosphate buffer. Elution of the orgotein is effected with 4 liters of the same buffer having a NaCl concentration increasing from 0 to 0.08 M. Measure the Cu and Zn contents and $A_{265}$ and $A_{280}$ absorbance of the eluate, e.g., as described in Application Ser. No. 205,610. Three major peaks appear, each with fine structure, starting at 575 ml., 750 ml. and 1,425 ml. of the gradient eluate. The orgotein (2nd peak) is present in the portion of the eluate where the $A_{265}/A_{280}$ absorbance ratio is 1.27 and the Cu and Zn contents are maximum. The 750 ml.–1030 ml. (0.025–0.035 M) portion of the gradient eluate contains substantially all of the orgotein in a high state of purity.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of an orgotein-rich protein concentrate substantially free of hemoglobin and carbonic anhydrase from red blood cells which comprises the steps of heating hemoglobin-containing red blood cells, in the presence or absence of the serum portion of whole blood, at a pH from 5–8 at which the hemoglobin precipitates and at a temperature of about 60–80° C.; cooling the heated mixture; separating the precipitated proteins from the heated mixture; and separating the orgotein from the supernatant.

2. A process according to claim 1, wherein the red blood cells are bovine.

3. A process according to claim 1, wherein the red blood cells are human.

4. A process according to claim 1, wherein whole blood is employed as starting material.

5. A process according to claim 1, wherein serum-free red blood cells are employed as starting material.

6. A process according to claim 1, which comprises diluting the starting material for the heating step with up to about 3 volumes of water prior to heating.

7. A process according to claim 1, wherein the orgotein is separated from the supernatant by lyophilization or by ultrafiltration.

8. A process according to claim 1, wherein the red blood cell are heated at a pH of about 6.8–7.4.

9. A process according to claim 1, wherein the heating step is conducted at about 65–75° C.

10. A process according to claim 9, wherein the heating step is conducted at about 75° C. for about 1–2 hours at a pH of about 6.8 to 7.4.

11. A process according to claim 10, wherein whole blood is employed as starting material in the heating step.

12. A process according to claim 11, wherein the blood is bovine blood.

13. A process according to claim 11, wherein the blood is human blood.

14. A process according to claim 11, wherein the orgotein is separated from the supernatant by lyophilization or by ultrafiltration.

15. A process according to claim 1 wherein prior to the separation of the orgotein from the supernatant, the supernatant is subjected to the enzymatic action of a protelytic enzyme.

16. A process according to claim 15 wherein whole blood is employed as starting material in the heating step.

References Cited

UNITED STATES PATENTS

| | | | |
|---|---|---|---|
| 3,579,495 | 5/1971 | Huber | 260—115 |
| 3,624,251 | 11/1971 | Huber | 260—112 RX |
| 3,687,927 | 8/1972 | Huber | 260—112 RX |

FOREIGN PATENTS

| | | |
|---|---|---|
| 1,160,151 | 7/1969 | Great Britain. |

HOWARD E. SCHAIN, Primary Examiner

U.S. Cl. X.R.

266—41, 143; 434—127